INVENTORS
WILLIAM R. AHRENDT
HAROLD B. REX

Patented Mar. 13, 1951

2,544,643

UNITED STATES PATENT OFFICE 2,544,643

APPARATUS FOR COMPENSATING FOR FREQUENCY CHANGES

William Robert Ahrendt, College Park, Md., and Harold B. Rex, Falls Church, Va.

Application November 1, 1949, Serial No. 124,934

4 Claims. (Cl. 250—40)

(Granted under the act of March 3, 1883, as amended April 30, 1928; 370 O. G. 757)

The present invention relates to apparatus for compensating for frequency changes and more particularly to apparatus which varies the resonant frequency of a tuned circuit in dependence on the frequency of the voltage fed to the circuit.

This invention is particularly applicable to servo mechanisms having tuned damping circuits. In using a conventional servo system the operator wishes to rotate one shaft and thereby cause a motor to rotate another shaft through the same angular displacement. The operator rotates a synchro transmitter which is connected electrically to a synchro control transformer. The control transformer generates an error of voltage which is proportional to the angular difference between the orientation of the synchro transmitter and the synchro control transformer. This error of voltage is amplified and transmitted to a motor which turns the work shaft. A mechanical connection between the shaft turned by the motor and the synchro control transformer causes the synchro control transformer to be rotated in a direction and to an extent dependent upon the rotation of the motor. When the shaft and the control transformer turn sufficiently to line up the control transformer with the transmitter, the control transformer discontinues sending an error voltage to the amplifier, and the motor, receiving no current from the amplifier, stops. In a properly operating synchro system, the motor stops when its angular movement is equal to the angular movement of the synchro transmitter.

A difficulty arises in such devices from the fact that the mechanical components of the device have inertia. The error voltage operates to start the motion. When the motor has rotated through the proper angle, the error signal falls to zero, but mechanical inertia of the motor causes it to continue rotation. The error signal is then reversed to cause the motor's rotation to reverse, it may again overshoot the proper position. This overshooting on both sides of the desired position may continue for several cycles and is referred to as "hunting." Hunting oscillation is generally undesirable, and various circuits are added to the servo mechanisms to cause them to exert a breaking or damping action on the mechanical components.

One such damping circuit involves a tuned series resonant circuit in the input to the servo amplifier. The error signal is fed to the amplifier from the resonant circuit at sixty cycles and the resonant circuit operates to feed to the amplifier a control voltage which is a function of both the angular displacement of the control transformer from the transmitter and the rate of change of this angle. Thus, this circuit provides a type of anticipation mechanism. The motor will receive a signal to stop rotation before it has reached the proper position and mechanical inertia will cause the motor to continue rotation until the motor reaches the proper position. Such a circuit operates satisfactorily to damp the servo hunting motion, if it is accurately tuned to the frequency of the source voltage. This circuit depends, however, upon resonance and must be tuned to the frequency of the error signal. In many installations, such as those aboard ship or in airplanes, the source voltage varies somewhat above and below the standard sixty-cycle frequency. Therefore, a circuit tuned for sixty cycles will not operate properly on such a power system. The frequency of the source voltage is, however, maintained generally within plus or minus 10%.

It is accordingly an object of my invention to provide a control circuit which will prevent hunting in servo mechanisms although the servo mechanism is powered by a source voltage with slightly varying frequency.

It is accordingly an object of my invention to provide a circuit which will prevent hunting in a servo mechanism despite a variation in the frequency of the source voltage.

Another object of my invention is to provide an automatic compensator for use with a tuned circuit to retune the circuit to correspond with the frequency of the source voltage.

It is another object of my invention to provide a compensator which varies the resonant frequency of a circuit in dependence upon the frequency of the source voltage but is independent of the magnitude of the voltage of the power source.

A more specific object of my invention is to provide a compensator for a tuned circuit which causes the tuned circuit to remain resonant if the voltage fed thereto varies in frequency by ten per cent (10%).

Still another object of the present invention is to provide a tuned circuit which remains tuned to the frequency of the power source despite small variations in the frequency of the source.

In accordance with the present invention a series resonance circuit comprising a capacitor and a saturable reactor is used. Other frequency sensitive apparatus provides a current indicative of the deviation of the power source from the standard sixty cycle frequency. The apparatus is so arranged that this current flows to saturate the saturable reactor and thereby change the impedance. The change in impedance is such as to cause the reactor and capacitor to be resonant at the frequency of the power source even if the frequency of the power source varies from sixty cycles.

Other objects and many of the attendant advantages of this invention will be readily appreciated as the same become better understood by reference to the following detailed description when connection with the accompanying drawing in which reference numerals designate like parts throughout the figures thereof and wherein.

Figure 1:
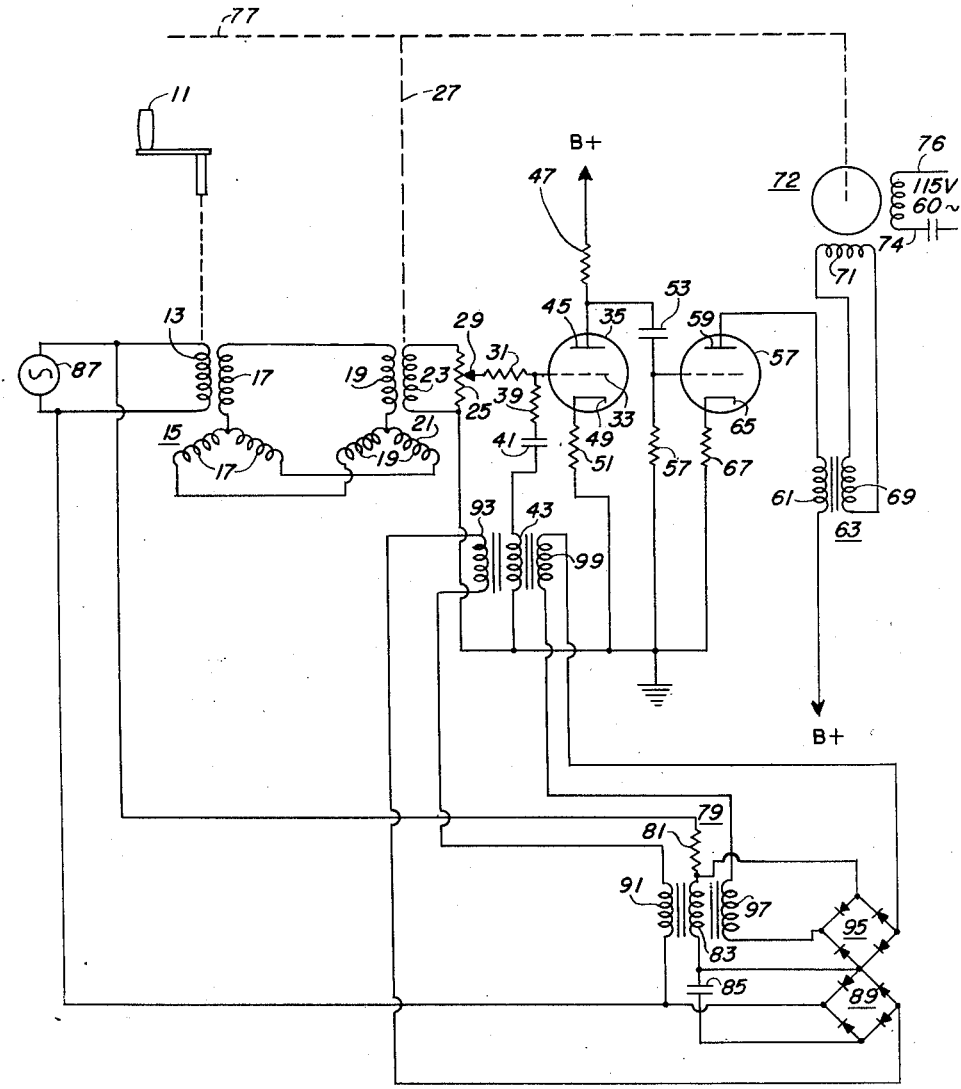
Figure 1 is a schematic circuit diagram of a servo mechanism employing my invention.

Referring now to the drawings, there is shown in Figure 1, a servo mechanism. A voltage source of one hundred fifteen (115) volts and sixty (60) cycles is connected to one winding of the synchro transmitter. A mechanical coupling graphically illustrated as a hand crank is shown connected to the rotor 13 of the transmitter 15. The three stator windings 17 of transmitter here are shown connected to the three stator windings 19 of the control transformer 21. The rotor windings 23 of the control transformer 21 are shown connected to a resistor 25. A mechanical coupling 27 is connected to the rotor 23 of the control transformer 21. The resistor connected to the rotor winding of the control transformer has mid-tap 29 connected through a resistor to the grid 33 of the amplifier tube 35. One terminal of the resistor 25 connected to the rotor 23 of the control transformer 21 is connected to ground. Between the resistor 31 and the grid 33 of the amplifier tube 35 a circuit 37 comprising a resistor 39, a capacitor 41, and saturable reactor 43 is connected. The anode 45 of the amplifier tube 35 is connected through a resistor 47 to the positive terminal of the battery. The cathode 49 is connected through a resistor 51 to ground. The anode 45 is also connected through a capacitor 53 to the grid 55 of second amplifier tube 57 and the grid 55 is connected through a resistor 57 to the ground. The anode 59 of the second amplifier tube 57 is connected through the primary 61 of a transformer 63 to the positive terminal of the B-battery. The cathode 65 is connected through a resistor to ground 67. The secondary 69 of this transformer is connected to a winding 71 of a motor 72. Other windings 73 of the motor 72 are connected to a suitable supply as for example to the hundred and fifteen volt sixty cycle lines 74. The motor 72 has a mechanical coupling to the rotor of the control transformer and to a shaft 77 to provide the usable power.

A second resonant circuit 79 comprising a resistor 81, a saturable reactor 83 and a capacitor 85 is connected to the power source 87.

A full wave rectifier 89 is connected across the capacitor 85 to provide direct current which flows through windings 91 and 93 on the saturable reactor 83 and the saturable reactor 43 connected to the grid of the first amplifier tube 35. A second full wave rectifier is connected across the saturable reactor 83 and provides direct current through windings 97 and 99 on this saturable reactor 83 and the saturable reactor 43 of the tuned circuit connected to the grid 33 of the first amplifier tube 35. Both the tuned circuit connected between the grid 33 of the first amplifier tube 35 and the ground, and the circuit connected to the supply source 87 are tuned to the standard frequency of the supply source, e. g., a sixty (60) cycle frequency if no current is flowing through the auxiliary windings 91, 93, 97 and 99 on the saturable reactors 43 and 83.

The operation of this circuit is as follows:

A rotation of the synchro transmitter 15 sends current through the three wires connected between the transmitter 15 and the control transformer 21 to indicate to the control transformer 21 by an error signal that there is an angular difference between the position of the transmitter 15 and the control transformer 21. This error signal is transmitted to the resistor 25 connected to the rotor 23 of the control transformer 21. This is an alternating voltage of the standard foregoing, e. g., sixty (60) cycles, the envelope of which is proportional to the angular difference in orientation. This voltage is fed to the tuned circuit which should resonate at this frequency. If it does resonate properly, the voltage of the error signal is amplified by the two stages of the amplifier and fed through the transformer 63 to provide a control voltage for the motor 72. The motor 72 then rotates through the proper angle causing the control transformer 21 to rotate through the same angle. When the motor 72 has rotated, the control transformer 21 and the transmitter 15 should be oriented in the same angular position. If, however, the frequency of the power source 87 deviates from the standard frequency e. g., sixty (60) cycles, the tuned circuit will not resonate at that frequency since it is tuned to the standard frequency of sixty (60) cycles. Compensation for this error of frequency is provided by the compensator circuit.

The voltage supply is impressed on a second resonant circuit 79 of the compensator circuit which is tuned also to the standard frequency e. g. sixty (60) cycles. If the supply of voltage is not of the standard frequency e. g., sixty (60) cycles a difference will exist between the voltage impressed across the reactor 83 and across the capacitor 85. The voltage across the reactor 83 is fed through the auxiliary winding 99 of the saturable reactor which is connected in the amplifier circuit to cause it to tend to saturate. The same current flows through the auxiliary winding 97 of the saturable reactor 83. The voltage across the capacitor 85 in the resonant circuit 79 is fed through windings 91 and 93 in the saturable reactor of each tuned circuits, but flows in an opposite direction so as to cancel the flux set up by the current flowing through the windings 97 and 99 as a result of the voltage across the reactor. Thus, both saturable reactors 43 and 83 have a current flowing through their auxiliary windings which is effectively proportional to the difference in voltage across the saturable reactor and the capacitor of the control tuned circuit 79.

Since both tuned circuits are tuned to the same frequency and have the same current flowing through their auxiliary windings, both circuits will continue to tune to the same frequency even after current flowing through the auxiliary windings in the saturable reactors 43 and 83 have changed the frequency of resonance of the circuits. When the lower circuit becomes resonant the upper circuit becomes resonant. The connections are such as to cause the lower circuit to become resonant.

The above described circuit does not take into consideration voltage changes of the power source. It does, however, compensate in such a way that the frequency compensation does not introduce an error due to voltage variations. For example, if the voltage of the source increases appreciably, it will only act to cause the control transformer to provide a greater voltage and the motor to operate with more torque. Such operation is not regarded as faulty since it does not affect detrimentally the accuracy of the circuit. The auxiliary tuned circuit 79 may cause a greater current to flow through the auxiliary windings on the saturable reactor if the source voltage is abnormally high, but the increase in current is not damaging and the current will become zero when the two circuits are properly tuned. Thus, this circuit provides a simple method of compensating for frequency variations in the voltage of the source and its operation is not affected by voltage variations.

The above described circuit is a simple method of compensating for frequency variation. It does not include an amplifier in the compensation circuit other than that inherent in the saturable reactor, since, in some environments, it is desirable to avoid additional amplifiers from such a circuit. However, the compensation circuit depends upon current flow through the saturating windings to tune the circuits. If the frequency of the source differs from sixty (60) cycles, a current must constantly flow in the reactors to retune the resonant circuits. If the auxiliary tuned circuit 79 is resonant, current flowing through the saturable reactors is negligible. But current flow through the saturating windings is required if the reactors are to be tuned. Therefore, the auxiliary tuned circuit must always be somewhat out of resonance to provide tuning if the frequency of the power source is not sixty (60) cycles. It is desirable in such arrangement that this unavoidable error voltage be a minimum.

Figure 2:
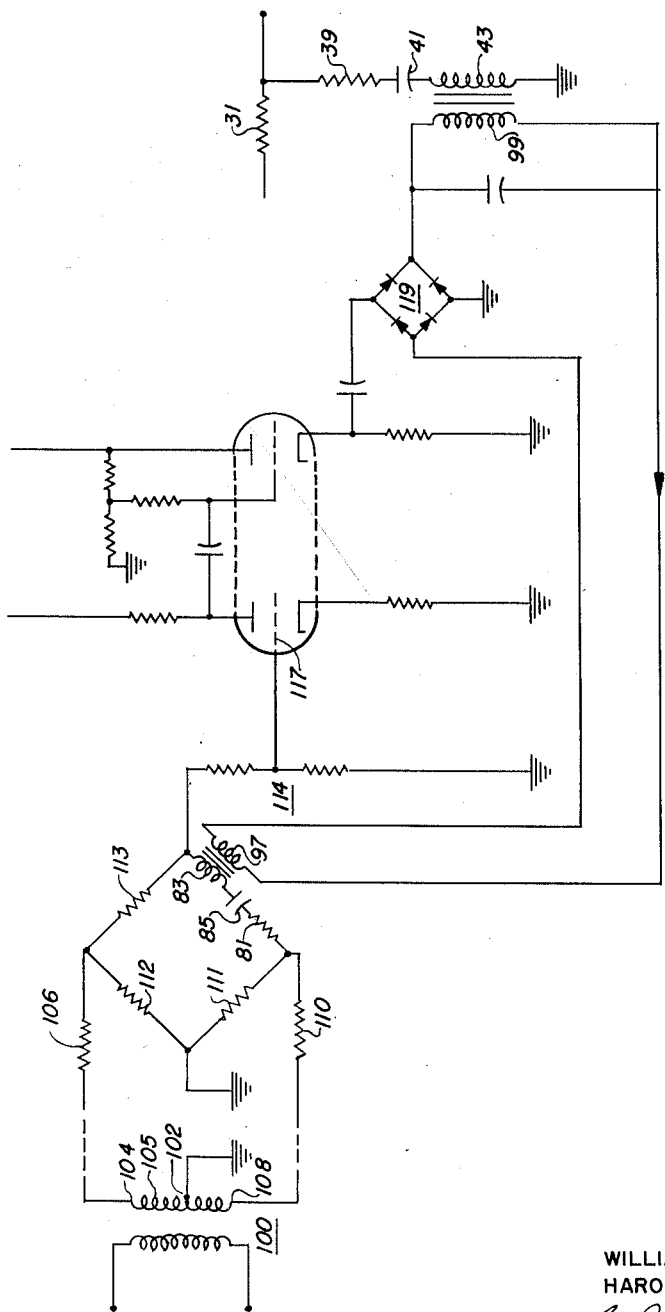
Figure 2 is a circuit diagram showing another form of compensator according to the present invention.

Accordingly, Fig. 2 shows a circuit which decreases the error voltage and enables the tuned circuit to be resonant at more nearly the exact frequency of the power source. To provide such an effect amplifiers are not gravely undesirable in some arrangements since the servo mechanism itself involves an amplifier and the addition of one tube to the circuit will not be a serious liability.

Figure 2 shows only the compensator arrangement and the tuned circuit of the servo mechanism. The entire servo mechanism is not shown in Fig. 2 since it is the same as that shown in Fig. 1 and its detailed operation is not pertinent to an explanation of the control. The resonant circuit, the grid resistor, and the resistor capacitor and saturable inductor are shown as if connected in the servo mechanism. The object of the apparatus shown in Fig. 2 is to change the resonant frequency of the tuned circuit connected between the grid resistor and ground.

This control circuit comprises a power transformer 100 connected to a source of supply i. e. one hundred fifteen volts, sixty cycle power. A mid tap 102 on the secondary of the transformer is connected to ground. One terminal 104 of the secondary 105 of the transformer 100 is connected through a resistor 106 to one terminal of the bridge. The other terminal 108 of the secondary 105 of the transformer 100 is connected through a second resistor 110 to another terminal of the bridge. The bridge comprises three legs having resistors 111, 112, and 113 and one leg having a resistor 81, a capacitor 85, and a saturable reactor 83. One terminal of the bridge is connected to ground and another is connected through a voltage divider 114 comprising two resistors 115 and 116 to ground. The mid-tap on the voltage divider 114 is connected to the grid 117 of the first stage of a two stage amplifier. The output of the amplifier is impressed on a full-wave rectifier 119. The rectifier 119 is connected to pass current through the auxiliary winding 99 on reactor 43 and winding 97 on reactor 83.

The operation of this circuit is as follows:

The voltage of the power source is connected across the bridge to impress an alternating current on the auxiliary tuned circuit which forms a leg of the bridge.

The frequency sensitive bridge is so constructed that no voltage appears between ground and the upper terminal of the voltage divider 114 when the tuned circuit is resonant. The circuit constants of the frequency sensitive bridge are so selected that a zero voltage appears between ground and one terminal of the voltage divider at some frequency other than that for which this circuit is expected to compensate. Thus, within the range of frequency for which the apparatus is designed a voltage will appear across the voltage divider. This voltage has a certain predetermined value when the frequency of the power source is sixty cycles. Other values of voltage across the voltage divider will indicate that the inductance of the saturable reactor in the auxiliary tuned circuit is either too high or too low for resonance condition at that frequency. Accordingly, the voltage across the voltage divider will indicate whether the saturable reactor should receive more or less current to retune it to resonance. This signal impressed across the voltage divider is amplified by the two stage amplifier and the current at the output is sent through auxiliary windings in the tuned circuit associated with the synchro and the same current will pass through auxiliary windings associated with the auxiliary tuned circuit. Since the circuit constants of both the auxiliary and the servo tuned circuits are the same, the synchro tuned circuit will also be resonant when the auxiliary tuned circuit is resonant.

This amplification used in this embodiment of the present invention provides great tuning sensitivity, small variation from resonance in the auxiliary circuit will be amplified so as to provide a relatively large current flow to the inductor. In this arrangement as in the arrangement described in Figure 1, there will be a lag, that is, if the frequency of the source voltage is not the standard frequency e. g. sixty cycles, the auxiliary tuned circuit will be slightly non-resonant. The auxiliary tuned circuit must be off resonance to provide a current to vary the inductance of the saturable reactor. However, the presence of the amplifier decreases the error due to this required non-resonance, and the synchro tuned circuit will be substantially in resonance.

Figure 3:
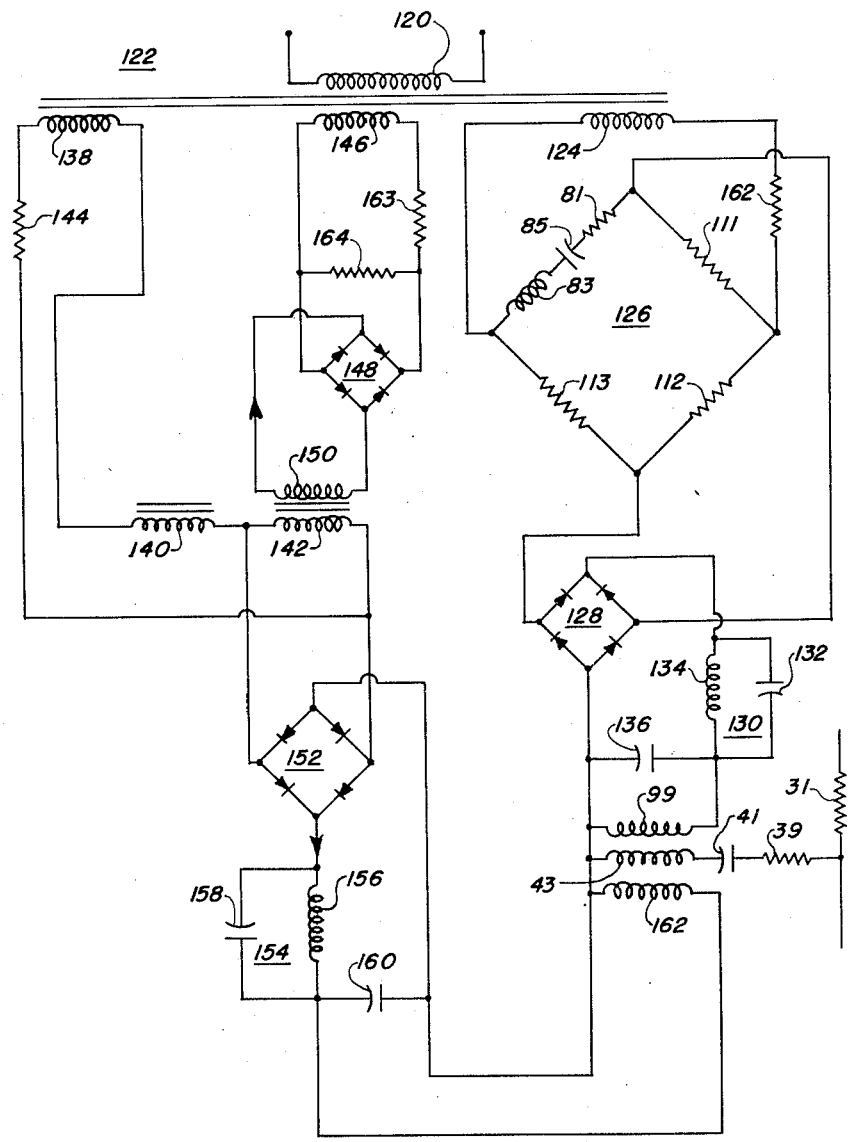
Figure 3 is a circuit diagram of still another embodiment of my invention.

The circuits described with reference to Figures 1 and 2 employ merely frequency sensitive devices and make no effort to compensate for changes in the source voltage. Another arrangement is shown in Figure 3, in which frequency deviation from the standard frequency e. g. sixty cycles is measured and current is passed through auxiliary windings in a saturable reactor in response to this measurement. In this arrangement, however, the inductance of the reactor in the frequency measuring network is not varied. A current which is a function of both frequency and voltage of the source is conducted through the auxiliary winding on the saturable winding of the servo tuned circuit. A voltage compensation circuit causes this current effectively to be a function of frequency only.

Referring to Figure 3, the primary 120 of a power transformer 122 is connected to a source of standard frequency sixty cycle 6.3 volts. One secondary 124 of this transformer 122 is connected to opposite corners of a bridge 126. Three legs of the bridge are resistors 111, 112, and 113 and the fourth leg comprises a resistor 81, a compacitor 85, and an inductor 83. The other corners of the bridge are connected to a full wave rectifier 128 which passes current through a filter network 130 comprising a capacitor 132 and an inductor 134 in parallel and a smoothing capacitor 136 connected across the line. Current flowing from the full wave rectifier flows through an auxiliary winding 99 in the saturable reactor 43 of the tuned circuit of the synchro.

A second secondary 138 on the power transformer 122 is connected to pass current through two reactors 140 and 142 and a current limiting resistor 144. A third secondary 146 on the power transformer 122 passes current through a full wave rectifier 148. The output of the full wave rectifier 148 is connected to the auxiliary windings 150 on one of the inductors 142. A second full wave rectifier 152 is connected across the saturable reactor 142. The second full wave rectifier 152 is connected to a filter network 154 comprising an inductor 156 and a capacitor 158 in parallel and a smoothing capacitor 160 connected across auxiliary windings 162 on saturable reactor 43 of the synchro tuned circuit.

The operation of this circuit is as follows:

The bridge 126 forms a frequency sensitive network. The voltage which this circuit impresses on the full wave rectifier 128 is a function of the frequency of the power source. The current flowing from the full wave rectifier 128 through the auxiliary winding 99 of the synchro tuned circuit varies the inductance of the saturable reactor 43 to make this tuned circuit resonant at the frequency of the power source. However, an error can be introduced if the voltage of the power source is higher or lower than its nominal rating. In the event that it is higher, the voltage flowing through the auxiliary winding 99 of the saturable reactor 43 will be higher than indicated by the frequency of the source. If the voltage is lower than its nominal rating, the current flowing in the auxiliary winding 99 will be too low. Another circuit is, therefore, provided to compensate for this error which voltage variations can introduce into the circuit.

The circuits connected to the second and third secondaries 138 and 146 of the power transformer 122 provide a current which flows through the second auxiliary winding 162 on the saturable reactor setting up flux in opposition to the flux set up by current in the auxiliary winding 99. This current is substantially proportional to the voltage impressed on the primary 120 of the power transformer. The current flowing through the auxiliary winding on the saturable reactor 142 associated with the third secondary 146 of the transformer 122 varies the inductance of the saturable reactor 142 in order to cause the current flowing through the second auxiliary winding 162 of the saturable reactor connected in the synchro circuit to become a non-linear function of the supply voltage. The two reactors 140 and 142 associated with the second and third secondaries 138 and 146 of the power transformer 122 are in effect a voltage divider. The saturable reactor 142 has a variable impedance which varies, to some extent, the saturation effect that current flowing in the second secondary 138 will cause in the saturable reactor 43.

Experimentation has indicated that the current which flows through the second auxiliary winding of the saturable reactor should not be directly proportional to the voltage of the power source since such operation does not compensate properly for the error introduced due to variations in voltage. For that reason the second and third secondaries 138 and 146 of the power transformer are so connected to this winding that the second auxiliary winding 162 of the saturable reactor 43 receives a current which is a non-linear function of the voltage of the power source. In one experimental arrangement which I found to satisfactorily perform its function, the following values of circuit elements were used:

*Resistors—all ½ watt*

|  | Ohms |
|---|---|
| 111 | 5000 |
| 81 | 1200 |
| 112 | 5000 |
| 113 | 5000 |
| 162 | 1000 |
| 163 | 3300 |
| 164 | 1200 |
| 144 | 2400 |

*Capacitors*

|  | Microfarad |
|---|---|
| 39 | 0.171 |
| 85 | 0.1 |
| 136 | 2.0 |
| 160 | 2.0 |
| 132 | 0.1 |
| 158 | 0.1 |

*Rectifiers*

Conant type B (a bridge type dry rectifier rated 5 mills at 10 volts) series 160 instrument rectifier.

*Reactors*

43—Square stack of 0.014″ Allegheny "Mumetal" (a Ni-Fe alloy having high mu at low flux diversities) F-11 laminations, 100% interleaved. One A. C. coil of 5,000 turns #36 "Formvar" (wire covered with a rugged insulation) on center leg. Double D. C. control windings, 2 coils of 10,000 turns of #40 "Formvar" on each outer leg. Each pair of control windings connected series opposing. Air-gap in center leg varied to obtain desired inductance during adjustment.

83—Square stack of 0.014" Magnetic Metals Co. "Hymu" (a Ni-Fe alloy having high mu at low flux densities) F-52 laminations, 100% interleaved. One coil of 11,000 turns of #38 "Formvar" on center leg. Adjust air-gap for an inductance of 40 henrys at 1 volt A. C.

142—Square stack of 0.014" Allegheny "Mumetal" F¹-11 laminations, 100% interleaved. One A. C. coil of 1500 turns of #32 "Formvar" on center leg. One D. C. control winding of 9,000 turns of #36 "Formvar" on each outer leg. Control windings connected series opposing.

140—Square stack of 0.014" Allegheny "Mumetal" F-11 laminations, 100% interleaved. One coil of 5,000 turns of #36 "Formvar" on center leg. Air-gap adjusted for approximately 40 henrys at 50 volts A. C.

$L_5$ and $L_6$—Square stack of 0.014" Allegheny "Mumetal" F-12 laminations, 100% interleaved. One coil of 2000 turns of #34 "Formvar" on center leg.

122—Supply transformer. Primary—6.3 volts, 60 cycles. Secondary No. 124—8 volts, No. 146—3 volts, No. 138—50 volts.

Figures 4 through 7 of the drawings set forth graphically the problem that has presented itself and the manner in which the present invention solves the problem.

Figure 4:
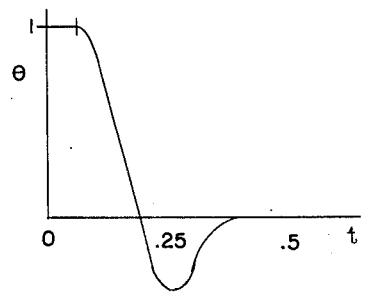
Figure 4 is a graph of the angular error of the synchro control transformer embodied as a function of time.

Figure 4 is a graph in which the ordinate is angular displacement of the control transformer rotor 23 from the angle of the transmitter rotor 13. At zero time on this graph the transmitter rotor has been rotated through an angle O. The control transformer rotor quickly moves through this angle, but the inertia of the mechanical elements which are rotating carries the rotor 23 beyond the zero point at which the two rotors are in angular coincidence. An error voltage in the opposite direction causes the control transformer rotor 23 to come back to zero error. The damping circuit referred to in this application as the tuned circuit in the synchro circuit causes a damping which enables the control transformer to reach a point of zero error after only one swing past the desired position in approximately 0.36 second the rotors 13 and 23 are in angular coincidence.

Such operation is completely satisfactory and Figure 4 represents actual experimental results using a synchro with an uncompensated tuning circuit. The frequency of the power source in this test was 60 cycles.

Figure 5:
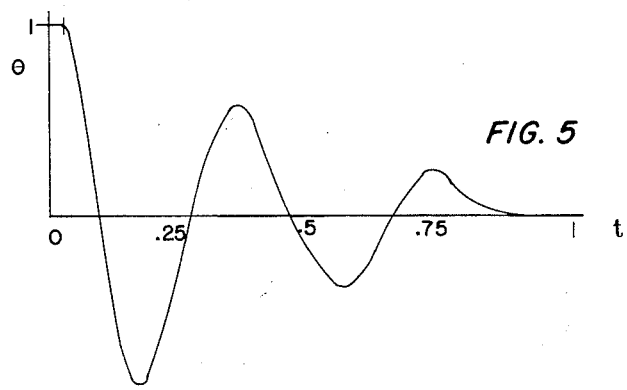
Figure 5 is another plot of the angular error of the control transformer as a function of time when the frequency of the source voltage is sixty-six cycles.

Figure 5, however, shows the resultant operation of the synchro when the frequency of the source is 66 cycles. In this test the control transformer overshot the coincidence mark several times making slightly more than two cycles of oscillation. Approximately 0.90 second was required for the control transformer 23 to home to the proper angle. Such a delay is unsatisfactory for refined work.

Figure 6:
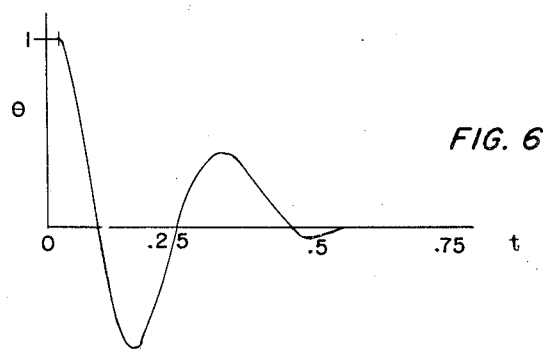
Figure 6 is another graph of the angular error of the control transformer plotted against time when the frequency of the power source is fifty-four cycles.

Figure 6 shows the operation of a synchro when the source voltage is 54 cycles. In this case, the control transformer passed through approximately 2½ cycles of oscillation and required 0.60 second to home. The values 66 cycles and 54 cycles were used in the experiments since it is not customary for a ship or plane power source to vary more than 0.1 from its proper 60 cycles frequency. The compensation networks are, therefore, so arranged that they can compensate for a 10 per cent frequency error. Any greater error should be corrected in the alternator of the ship or plane itself.

Figure 7:
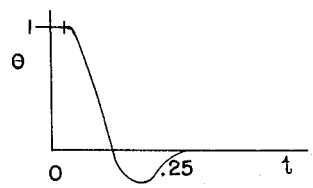
Figure 7 is a plot of the angular error of the control transformer plotted against time when the frequency of the power source is sixty cycles and a regulator compensator according to this invention is used.

Figure 7 shows the position of the control transformer 23 when the source voltage is within 10% of 60 cycles and a regulator compensator according to the present invention is employed. The control transformer then homes in approximately .25 second. It overshoots the zero point only once. Such operation is the expected one and is completely satisfactory for normal servo operation.

Obviously, many modifications and variations of the present invention are possible in the light of the above teaching. It is therefore to be understood that within the scope of the appended claims the invention may be practised otherwise than is specifically described.

The invention described herein may be manufactured and used by or for the government of the United States of America for governmental purposes without payment of any royalties thereon or therefor.

We claim:

1. In combination, a capacitor and a saturable inductive reactor, a source of power, series connections between said inductive reactor, capacitor and source of power, a first and second auxiliary winding on said saturable reactor, a first rectifier connected in series with said first auxiliary winding and said reactor for setting up magnetic flux in one direction in said saturable reactor, a second rectifier connected in series with said second auxiliary winding and said capacitor for setting up magnetic flux in the opposite direction in said saturable reactor.

2. In combination, a circuit including a first reactor having a saturating winding, said circuit being tuned to be resonant at a predetermined frequency, a power source feeding said circuit, a frequency sensitive bridge circuit connected to said power source having impedance elements including a second reactor having a second saturating winding inductively coupled thereto proportioned so that zero voltage appears across opposite terminals thereof at said predetermined frequency, means for deriving from said frequency sensitive circuit a current which is a function of the difference between the frequency of said power source and said predetermined frequency, a compensating circuit connecting said first and second saturating windings in series, means for causing said current to flow in said series compensating circuit partially to saturate said reactors, the function of frequency difference which said current follows being such that when said current flows in said first and second saturating windings said reactors will be tuned to cause their respective circuit to become resonant at substantially the frequency of said source.

3. In combination a first and a second tuned circuit comprising a saturable reactor and a capacitor, a first and a second auxiliary winding on each of said first and second saturable reactors, a first rectifier connected to receive current from said first saturable reactor, connections between said first rectifier and said first auxiliary windings on said first and second saturable reactors whereby current flowing through said auxiliary windings sets up flux in one direction in said saturable reactors a second rectifier connected to receive current from said first capacitor, connections between said second rectifier and said second auxiliary windings on said first and second saturable reactors whereby current flowing through said second auxiliary windings sets up flux in the other direction.

4. In combination a first and a second tuned circuit comprising a saturable reactor and a capacitor, a first and a second auxiliary winding on each of said first and second saturable reactors, a first rectifier connected to receive current from said first saturable reactor, connections between said first rectifier and said first auxiliary windings on said first and second saturable reactors whereby current flowing through said auxiliary windings sets up flux in one direction in said saturable reactors, a second rectifier connected to receive current from said first capacitor, connections between said second rectifier and said second auxiliary windings on said first and second saturable reactors whereby current flowing through said second auxiliary windings sets up flux in the other direction, the windings being so constructed that the auxiliary windings on the second saturable reactor tend to cause the reactance of the first and second reactor to decrease if the voltage impressed across the first saturable reactor is greater than the voltage impressed across the first capacitor.

WILLIAM ROBERT AHRENDT.
HAROLD B. REX.

REFERENCES CITED

The following references are of record in the file of this patent:

UNITED STATES PATENTS

| Number | Name | Date |
|---|---|---|
| 2,463,533 | Harrison | Mar. 8, 1949 |